No. 838,755.　　　　　　　　　　　　　　PATENTED DEC. 18, 1906.
J. H. SMITH.
FINGER NAIL TRIMMER.
APPLICATION FILED MAY 4, 1904.
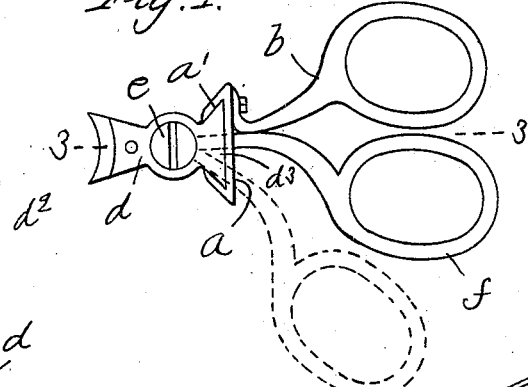
Fig. 1.
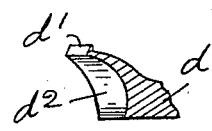
Fig. 4.
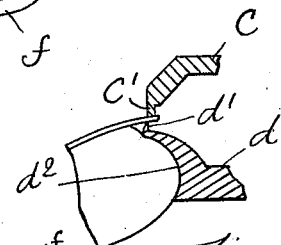
Fig. 5.
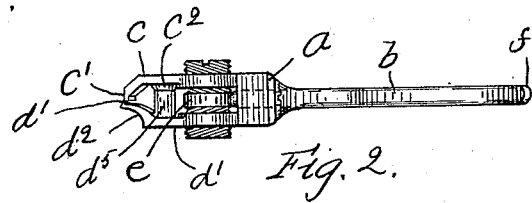
Fig. 2.
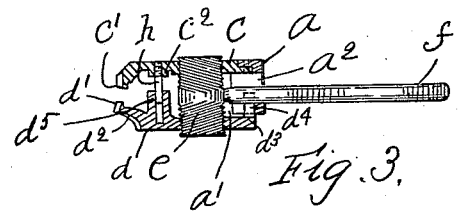
Fig. 3.
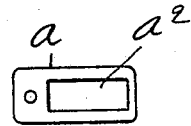
Fig. 9.
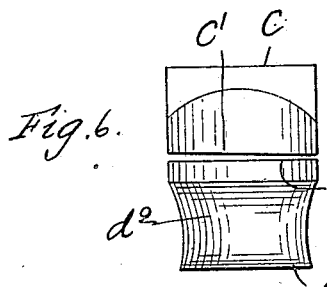
Fig. 6.
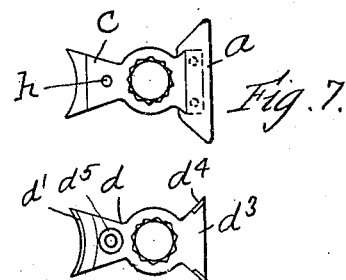
Fig. 7.
Fig. 8.
Witnesses:
H. B. Davis.
Maud M. Piper
Inventor:
James H. Smith
By Noyes & Heinemann
Attys

UNITED STATES PATENT OFFICE.

JAMES H. SMITH, OF BOSTON, MASSACHUSETTS, ASSIGNOR OF ONE-HALF TO JOSEPH V. CAIRNS, OF BOSTON, MASSACHUSETTS.

FINGER-NAIL TRIMMER.

No. 838,755.      Specification of Letters Patent.      Patented Dec. 18, 1906.

Application filed May 4, 1904. Serial No. 206,263.

*To all whom it may concern:*

Be it known that I, JAMES H. SMITH, of Boston, county of Suffolk, State of Massachusetts, have invented an Improvement in Finger-Nail Trimmers, of which the following description, in connection with the accompanying drawings, is a specification, like characters on the drawings representing like parts.

This invention relates to that class of devices which are primarily intended to be used for trimming the finger-nails.

The object of the invention is to produce a device of this character which may be operated by handles in the manner of an ordinary pair of scissors, but which is provided with curved cutting edges which may be brought together simultaneously or almost simultaneously, so that the nail may be trimmed evenly and quickly.

In the drawings, Figure 1 is a bottom plan view of a device made according to my invention. Fig. 2 is a side elevation thereof. Fig. 3 is a central longitudinal section on the line 3 3 of Fig. 1. Figs. 4, 5, and 6 are detail views of the cutting-jaws. Fig. 7 is a top plan view of the upper blade-shank and frame. Fig. 8 is a plan view of the inner or upper side of the lower shank. Fig. 9 is a detail view of the rear end of the body.

As shown in the drawings, the frame $a$ of the clippers is provided with a dovetail-shaped recess $a'$ in its under side and a slot $a^2$ in its rear side. A handle $b$ is rigidly secured to the rear side of the frame. An upper blade-shank $c$ is rigidly secured to the front side of the frame $a$, preferably by rivets, as shown in Figs. 3 and 7, the front end of said shank being provided with a cutting or shearing blade $c'$. A lower-blade shank $d$ is provided which corresponds in shape to the upper shank $c$ and is provided with a blade $d'$ at its front end. Said blade $d'$ is provided with a finger-receiving recess $d^2$ in its front side, said recess extending rearwardly from beneath its cutting edge and having its bottom transversely and longitudinally curved, similarly to the end of the human finger, so that the side of the under blade will not press against the end of the finger, and thus press the flesh up against the nail; but the cutting-edge portion may be readily passed under the portion of the nail which is to be trimmed, as shown in Fig. 5.

A dovetail-shaped projection $d^3$ is provided on the rear end of the shank $d$, said projection being so formed that it will fit closely into the correspondingly-shaped recess $a'$ in the frame. Two upwardly-projecting lugs $d^4$ are also provided on the inclined portion of said extension $d^3$, the sides of said lugs being continuous with the inclined sides of said extension and being adapted to bear against the inclined sides of the recess $a'$, thereby increasing the width of the bearing-surface of the extension $d^3$ against the inner sides of the frame-recess $a'$.

A stud $e$ is arranged perpendicularly of the shanks $c$ and $d$, the lower end of said stud having a right-hand screw-thread and the upper end having a left-hand screw-thread, said threads engaging correspondingly-formed screw-threads in the shanks $c$ and $d$, through which the stud passes. A handle $f$ passes through the slot $a^2$ of the frame and is secured in the stud $e$ at the middle thereof and at right angles thereto.

It will be apparent that when the stud $e$ is rotated by the handle $f$ the lower shank $d$ will be moved toward or away from the upper shank $c$, according to the direction in which the handle $f$ is swung, and the stud $e$ is rotated. In view of the fact that the distance which the handle $f$ must be moved is comparatively short it is necessary that the pitch of the threads on the stud be correspondingly great, so that the short rotation which it is possible to give the stud by the handle $f$ as it swings from the full-line position to the dotted-line position of Fig. 1 will be sufficient to move the cutting edges through the necessary distance.

In order that the stud may always be held as firmly as possible in the blade-shank, and yet that the threads on the stud may have a much greater pitch than the standard thread for a stud of the diameter of the stud $e$, I preferably provide eight distinct threads of relatively great pitch—for example, three to the inch on each end of the stud—the pitch being sufficient to separate the blade edges to such an extent that the nail may be readily inserted therebetween when the handles are separated. A guiding-pin $h$ is rigidly secured to one of the shanks, and preferably the upper shank, and the lower shank is provided with an inwardly-extending boss $d^5$, having a longitudinally-extending recess in which the stud $h$ is slidably fitted. A boss $c^2$ is also preferably provided on the under side of the upper jaw about the pin $h$, so that when the cutting edges are brought together the faces of the bosses $c^2$ and $d^5$ will meet and prevent the cutting edges from being moved so far that one will be dulled by the other. The pin $h$ coöperates with the guiding-lugs $d^4$ of the lower shank to hold both shanks rigidly in the same relation in all positions and to guide said lower shank in its movement toward and from the upper shank at opposite sides of the stud $e$, thereby overcoming the tendency to cramp the threads of the lower shank upon the threads of the stud when the blades are cutting, thereby relieving the threads from strain and wear to an extent and reducing the friction. The upper blade $c'$ moves down inside of the blade $d'$, so that the user may tell exactly where the nail is to be cut when it is being used for this purpose.

The length of movement of the handle necessary to open the blades may be decreased by pivoting the operating-handle in the upper shank at an intermediate point, the inner end of said handle being adapted to engage a projecting arm on the stud, thereby providing a compound lever. In such case the direction of the threads on the stud must be reversed, so that the blades will be closed when the handles are drawn together.

Having thus described my invention, what I claim as new, and desire to secure by Letters Patent, is—

1. In a finger-nail trimmer, a pair of shanks each having a blade at one end thereof, said blades being provided with coacting cutting edges, means for drawing said blades together comprising a rotatable stud having a screw-thread connection with one of said shanks, and means for rotating said stud to draw said shanks together, substantially as described.

2. In a finger-nail trimmer, a pair of shanks each having blades at one end thereof, said blades being provided with coacting cutting edges, means for drawing said blades together, comprising a stud having a screw-thread connection at each end with one of said shanks, and a handle for rotating said stud, substantially as described.

3. A device of the character described, comprising a body portion or frame, an upper shank secured thereto, a lower shank slidably mounted in said frame to move transversely toward and from said upper shank, said shanks having coacting cutting edges, and operating means for moving said edges together, substantially as described.

4. A device of the character described, comprising a body portion or frame, an upper shank secured thereto, a lower shank, a stud oppositely screw-threaded at its ends and engaging said shanks whereby said shanks may be moved together upon rotation of said stud, a blade at one end of each shank, a slidable connection between said shanks, whereby said blades may be made to coact, and means for rotating said stud, substantially as described.

5. A device of the character described, comprising a body portion or frame, an upper shank secured thereto, a lower shank, a stud oppositely screw-threaded at its ends and engaging said shanks, whereby said shanks may be moved together upon rotation of said stud, a blade at one end of each shank a slidable connection between said shanks, at each side of said stud, whereby said blades may be made to coact, and means for rotating said stud, substantially as described.

In testimony whereof I have signed my name to this specification in the presence of two subscribing witnesses.

JAMES H. SMITH.

Witnesses:
L. H. HARRIMAN,
H. B. DAVIS.